United States Patent Office 2,717,948
Patented Sept. 13, 1955

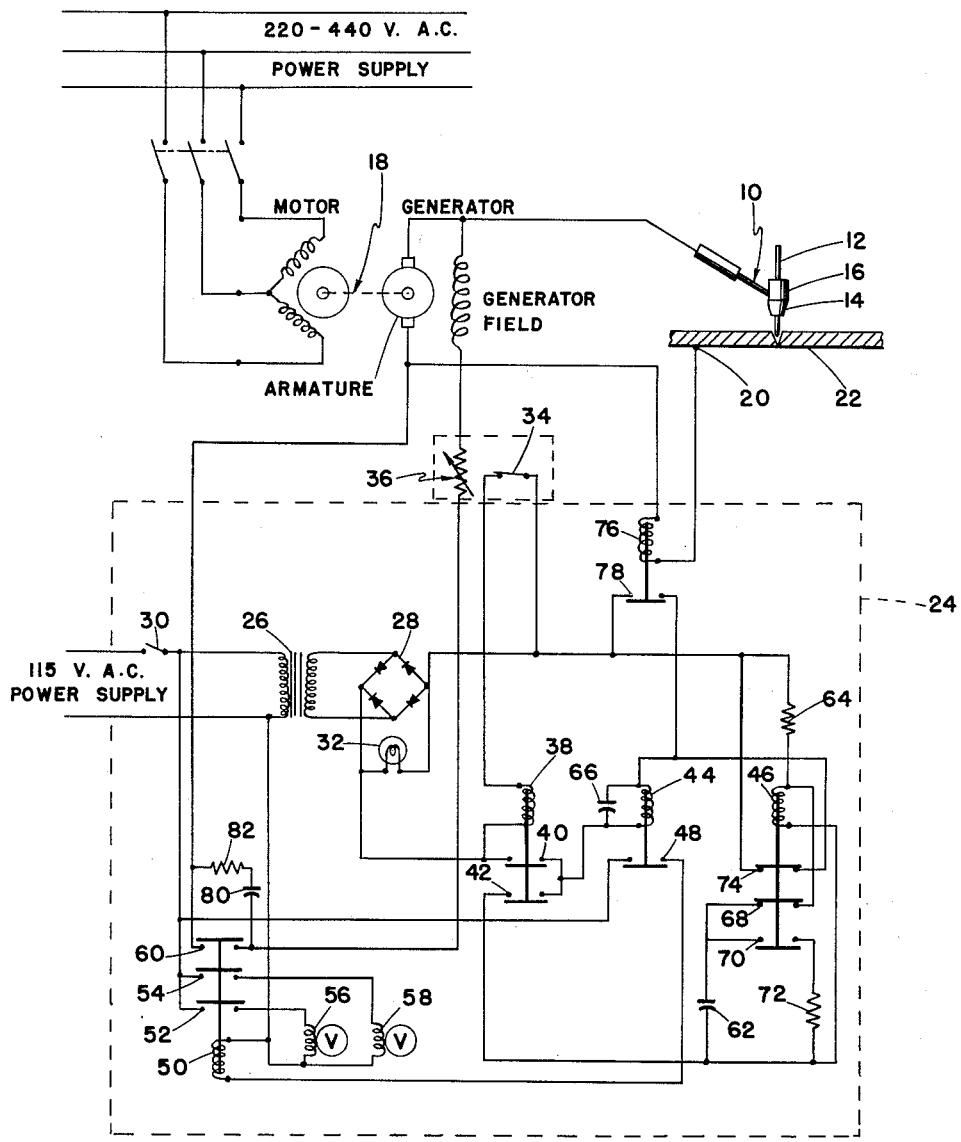

2,717,948

AUTOMATIC COOLANT AND INERT GAS CONTROL FOR INERT GAS SHIELDED WELDING

William S. Cockreil, San Diego, and Donald L. Heyser, Lemon Grove, Calif., assignors to The Ryan Aeronautical Co., San Diego, Calif., a corporation of California Application December 15, 1952, Serial No. 326,068

4 Claims. (Cl. 219—8)

The present invention relates generally to an inert gas and liquid coolant controller and more particularly to a device for controlling the flow of inert gas and liquid coolant used in an inert gas shielded electric arc welding apparatus.

The inert gas shielded electric arc welding method utilizes an inert gas such as helium or argon as a protective medium around the arc and also uses a liquid coolant to cool the torch and its electrical conductors. The flow of the inert gas and the coolant are usually controlled manually which is a wasteful and expensive practice especially in the case of the inert gas which is relatively costly.

It is necessary that the inert gas and coolant flow for a short period after the welding arc has been extinguished in order to prolong the life of the electrodes and other components of the welding apparatus; also the flow of inert gas and coolant must be started before the arc is struck, so the operator must spend much of his time controlling the operations especially when welding a number of small parts.

The primary object of this invention is to provide means for controlling automatically the flow of inert gas and liquid coolant.

It is another object of this invention to provide controlling means of the type described which will start the flow of inert gas and liquid coolant immediately before the arc is struck and will prolong said flow for the required period after the arc is extinguished.

Another object of this invention is to provide controlling means of the type described which may be connected to the controls normally used in the inert gas shielded electric arc welding apparatus, and may be used by the operator without the necessity for additional skill.

Another object of this invention, ancillary to the preceding objects, is to teach the best known mode of implementing the principles of the invention in carrying the invention into actual practice.

Another object of this invention is to provide controlling means of the type described which is inexpensive and practicable to manufacture.

Finally, it is an object to provide a controlling means of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which the single figure illustrates the wiring diagram of the device.

The inert gas shielded electric arc welding apparatus comprises a welding torch 10 having an electrode 12 surrounded by a nozzle 14 into which the inert gas is conducted by means of a suitable conduit, and a cooling jacket 16 to which liquid coolant is supplied also by means of a suitable conduit. The torch 10 is connected to a suitable source of power such as the motor-generator 18, the electrical circuit being completed by means of a ground connection 20 on the work 22.

The device is contained in a control box 24 and includes a power supply which provides the necessary electrical current to operate a time delay mechanism and the control mechanism. The power supply comprises a transformer 26 and a rectifier 28 connected to a suitable source of power and operated by means of a switch 30, and is provided with an indicator lamp 32 to light when the unit is in operation.

The time delay and control mechanisms are interconnected in such a manner that the construction may be best understood from a description of the operation of the device.

The operation is initiated by means of a normally closed switch 34 attached to the operator's foot control rheostat 36 in such a manner that said switch will be opened only at the maximum resistance position of said rheostat. In order to initiate the flow of inert gas and coolant it is necessary only that the operator operates the foot control in the normal manner to excite the generator field. This closes the switch 34 which energizes the relay 38 closing the contacts 40 and 42 which in turn energize the relays 44 and 46. Relay 44 operates immediately, closing contacts 48 which in turn energizes the relay 50. With relay 50 energized the contacts 52 and 54 are closed so operating the solenoid valves 56 and 58 which allows the inert gas and coolant to flow to the torch 10. Contacts 60 of the relay 50 are also closed completing the generator field circuit and allowing the operator to strike an arc. Relay 46 is delayed in its operation due to the fact that the condenser 62 draws sufficient current through the resistor 64 in charging to cause the voltage across the coil of said relay to drop below the required operating voltage. As the condenser 62 becomes charged, the voltage increases across the coil of the relay 46 until said relay operates. This delay is of a fraction of a second only and is necessary to ensure that the time delay condenser 66, which charges as the relay 44 is energized, is consistently charged for each operation.

When relay 46 operates the normally closed contacts 68 are opened and the normally open contacts 70 are closed allowing the charge in the condenser 62 to dissipate through the resistor 72; also the normally closed contacts 74 are opened, thus breaking the circuit from the power supply to the relay 44. The relay 44, however, is retained in the energized state by the charge in the time delay condenser 66 which dissipates slowly through the high resistance coil of said relay. The delay period thus caused may be from 5 to 10 seconds during which time the inert gas and coolant will continue to flow to the torch. If, during this delay period, the operator establishes an arc, the arc current will energize the relay 76, so closing the contacts 78, which action completes the circuit previously broken by the opening of the contacts 74. Thus the solenoid valves 56 and 58 will remain open allowing the inert gas and coolant to flow as long as the arc is maintained. The generator field circuit is provided with a condenser 80 and a resistor 82 connected across the contacts 60 to prevent any arcing which might occur at said contacts due to the relatively high current flowing in said circuit.

If the operator does not establish an arc before the delay period elapses, the relay 44 will finally become de-energized as the charge in the condenser 66 is dissipated, so opening the contacts 48 and breaking the circuit to the relay 50, which causes the contacts 52 and 54 to open breaking the circuit to the solenoid valves 56 and 58 which in turn shut off the flow of inert gas and coolant.

In the event that an arc is established and maintained, as soon as the arc is extinguished the relay 76 will be de-energized causing the contacts 78 to open and break the circuit to the relay 44 which in turn will stop the flow of inert gas and coolant after the delay period as previously described.

It should be noted that intermittent extinguishing of the arc will not cause the flow of inert gas and coolant to be shut off as long as the arc is re-established before the time delay period has elapsed. Thus the operator can maintain a continuous flow of inert gas and coolant while moving the torch from one piece of work to another if so desired.

When the device is first switched on by means of the switch 30, the switch 34 is already closed so that the inert gas and coolant will be allowed to flow for the duration of the delay period as previously described. This action serves to purge the inert gas and coolant supply conduits after the device has been in disuse for any reason. In order to initiate a cycle of operations, the switch 34 must first be opened and then closed for reasons which will be explained. The operator must open the switch 34 by actuating the foot control rheostat 36 in the normal manner, the opening of said switch causing the relay 38 to be de-energized so that the contacts 40 and 42 will open breaking the circuits and de-energizing the relays 44 and 46. With the relay 44 de-energized the contacts 48 will open breaking the circuit and de-energizing the relay 50 which in turn closes the solenoid valves 56 and 58, so shutting off the flow of inert gas and coolant. At the same time the contacts 60 will open breaking the generator field circuit and making it impossible to strike an arc without the flow of inert gas and coolant at the torch.

The device is now in the "ready" position, that is, there is no flow of inert gas or coolant and the arc cannot be struck, and the operation is completed by closing the switch 34 and initiating the series of actions as previously described.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

We claim:
1. Means for controlling the flow of inert gas and coolant in an electric arc welding apparatus including conduits for inert gas and coolant, solenoid valves in said conduits, operating means for said valves comprising a power supply, a valve control circuit, and a time delay circuit in said valve control circuit to delay the closing of said valves after the valve control circuit is de-energized, and a welding arc current control circuit actuated by and together with said valve control circuit.

2. Means for controlling the flow of inert gas and coolant in an electric arc welding apparatus including conduits for inert gas and coolant, solenoid valves in said conduits, operating means for said valves comprising a power supply, a valve control circuit, a time delay circuit to delay the closing of said valves after the valve control circuit is de-energized, said valve control circuit comprising a relay connected to said solenoid valves, said relay being operated by said time delay circuit, and a welding arc current control circuit actuated by said relay together with said valve control circuit.

3. Means for controlling the flow of inert gas and coolant in an electric arc welding apparatus including conduits for inert gas and coolant, solenoid valves in said conduits, operating means for said valves comprising a power supply, a valve control circuit, a time delay circuit to delay the closing of said valves after the valve control circuit is de-energized, said valve control circuit comprising a relay connected to said solenoid valves, said relay being operated by said time delay circuit, said time delay circuit comprising a delayed action relay, a capacitor connected across the coil of said relay to charge when said relay is energized, the electrical charge stored in said capacitor serving to energize said delayed action relay until said electrical charge is dissipated after energizing current to said delayed action relay is interrupted, and a welding arc current control circuit actuated by said first mentioned relay.

4. Inert gas and coolant control means according to claim 3 including a further relay to interrupt the energizing current to said delayed action relay, a capacitor connected across the coil of said last mentioned relay, said last mentioned capacitor delaying the de-energizing of said last mentioned relay to extend the energization of said delay action relay so that said first mentioned capacitor is fully charged.

References Cited in the file of this patent
UNITED STATES PATENTS

| | | |
|---|---|---|
| 2,510,205 | Baird | June 6, 1950 |
| 2,510,207 | Behnke | June 6, 1950 |
| 2,517,739 | Tyrner et al. | Aug. 8, 1950 |